US012743363B2

(12) United States Patent
Chen et al.

(10) Patent No.: US 12,743,363 B2
(45) Date of Patent: Sep. 22, 2026

(54) METHOD AND SYSTEM OF ATTESTING, EXAMINING AND QUICKLY TRACING SOFTWARE BILL OF MATERIALS

(71) Applicant: Chelpis Quantum Corporation, Taipei (TW)

(72) Inventors: Hsing-Chung Chen, Taipei (TW); Chia-Yen Lu, Taipei (TW)

(73) Assignee: Chelpis Quantum Corporation, Taipei (TW)

( * ) Notice: Subject to any disclaimer, the term of this patent is extended or adjusted under 35 U.S.C. 154(b) by 260 days.

(21) Appl. No.: 18/755,526

(22) Filed: Jun. 26, 2024

(65) Prior Publication Data

US 2026/0003767 A1 Jan. 1, 2026

(51) Int. Cl.
*G06F 9/44* (2018.01)
*G06F 11/362* (2025.01)

(52) U.S. Cl.
CPC ................................ *G06F 11/3636* (2013.01)

(58) Field of Classification Search
CPC ................................................... G06F 11/3636
See application file for complete search history.

(56) References Cited

U.S. PATENT DOCUMENTS 11,809,575 B1 * 11/2023 Reddy ................... G06F 21/577
2020/0201620 A1 * 6/2020 Beard ........................ G06F 8/61
2023/0088625 A1 * 3/2023 Yun .................... G06Q 20/4014 705/75
2024/0320624 A1 * 9/2024 Varghese ........... G06Q 10/0875

* cited by examiner

*Primary Examiner* — Hang Pan
(74) *Attorney, Agent, or Firm* — Che-Yang Chen; Law Office of Michael Chen

(57) ABSTRACT

A method of attesting, examining and quickly tracing a software bill of materials includes: registering with a coalition chain to gain access thereto; generating, by an e-wallet of a decentralized application module, a software coalition chain address; changing, by the decentralized application module, an initial software bill of materials into an integration software bill of materials including a software artifact information, software coalition chain address, correlated software information and correlated software coalition chain address; creating a hash tree tracing data by a tracing data creating module; assigning the software coalition chain address to the integration software bill of materials and the hash tree tracing data which are then uploaded to an InterPlanetary File System for acquiring a software content identifier; and assigning the software coalition chain address to the software content identifier to write the software coalition chain address and the software content identifier to the coalition chain.

11 Claims, 11 Drawing Sheets

METHOD AND SYSTEM OF ATTESTING, EXAMINING AND QUICKLY TRACING SOFTWARE BILL OF MATERIALS

FIELD

The present disclosure relates to software attesting, examining and tracing, and more particularly to a method and system of attesting, examining and quickly tracing a software bill of materials to attest software information of software materials definitely and impartially in order for the software information to be examined and traced.

BACKGROUND

Owing to the wide use and rapid development of electronic products, various novel computer software and hardware keep emerging. After being developed and commercially launched, each software is accompanied by its software information. The software information includes plenty of details, such as software developer's name, software artifact's name, software artifact's version, software artifact's launching date, and correlated software artifacts for use in software development. Commerically-available solutions for posting software artifact history online mainly involve manufacturers' integrating and publishing data. However, the commercially-available solutions are confronted with problems, because the data is registered or posted by the manufacturers. The underlying causes of the problems are as follows: product data undergoes integration ex parte; optimal impartiality of the data thus integrated is impossible to attain; and conventional software information management techniques rely upon databases for creating, changing and deleting data pertaining to assets (including tangible assets and intangible assets). However, software artifact information is predisposed to copying, tampering and deletion. Therefore, it is imperative for manufacturers to ensure the genuineness of software information.

Therefore, it is imperative for manufacturers to overcome the aforesaid drawbacks of the prior art.

SUMMARY

In view of the aforesaid drawbacks of the prior art, it is an objective of the disclosure to provide a method and system of attesting, examining and quickly tracing a software bill of materials to attest software artifact information of software artifact materials definitely and impartially in order for the software artifact information to be examined and traced.

To achieve the above and other objectives, the disclosure provides a method of attesting, examining and quickly tracing a software bill of materials, the method comprising the steps of: registering with a coalition chain to gain right to access the coalition chain; generating, by an e-wallet of a decentralized application module, at least one software coalition chain address; changing, by the decentralized application module, at least one initial software bill of materials into an integration software bill of materials comprising a software artifact information, the software coalition chain address, at least one correlated software information and at least one correlated software coalition chain address; using a tracing data creating module to treat a correlated coalition chain address as a leaf node and create a hash tree tracing data, the hash tree tracing data comprising at least the leaf node, at least one leaf node path data and a root hash value; assigning, by the decentralized application module, the software coalition chain address to the integration software bill of materials and the hash tree tracing data to upload the integration software bill of materials and the hash tree tracing data to an InterPlanetary File System (IPFS), acquiring a software content identifier (CID) from the InterPlanetary File System; and assigning, by the decentralized application module, the software coalition chain address to the software content identifier to write the software coalition chain address and the software content identifier to the coalition chain to allow the coalition chain to attest the software content identifier and a corresponding software coalition chain address and store the integration software bill of materials, the hash tree tracing data, the software content identifier and the software coalition chain address in a matching database.

In an embodiment of the method of attesting, examining and quickly tracing a software bill of materials according to the disclosure, the method further comprises, after the coalition chain has attested the software content identifier and a corresponding software coalition chain address, the steps of: acquiring, by the decentralized application module, a software coalition chain address of a software artifact information to be examined; acquiring, by the decentralized application module, a software content identifier corresponding to the software coalition chain address in a coalition chain; acquiring, by the decentralized application module, an integration software bill of materials and a hash tree tracing data from the InterPlanetary File System according to the acquired software content identifier; examining, by the decentralized application module, a software artifact information in the acquired integration software bill of materials and the correlated software artifact information to be examined.

In an embodiment of the method of attesting, examining and quickly tracing a software bill of materials according to the disclosure, the method further comprises, after the coalition chain has attested the software content identifier and a corresponding software coalition chain address, the steps of: acquiring, by the decentralized application module, a software coalition chain address of a software artifact information to be traced and examined and a correlated software coalition chain address; acquiring, by the decentralized application module, the software content identifier corresponding to the software coalition chain address from the coalition chain; acquiring, by the decentralized application module, the integration software bill of materials and the hash tree tracing data from the InterPlanetary File System according to the acquired software content identifier; treating, by the decentralized application module through the tracing data creating module, at least one leaf node path data of the acquired hash tree tracing data and a correlated software coalition chain address to be traced and examined as a leaf node and perform computation to generate a root hash value to be traced and examined; and comparing, by the decentralized application module, the root hash value of the acquired hash tree tracing data with the root hash value of the hash tree tracing data to be traced and examined.

In an embodiment of the method of attesting, examining and quickly tracing a software bill of materials according to the disclosure, the leaf node creates the hash tree tracing data according to a sequence rule, the sequence rule requires searching the software coalition chain address and a correlated software coalition chain address and comparing the words of each address, from the starting word to the final word, from the least number to the greatest number, from a to z among lower case letters of the alphabet, and from A to Z among upper case letters of the alphabet, wherein, if the same alphanumeric appears at the same position, the next word will be compared to perform sorting, achieving a leaf node sequence, from left to right, in a hash tree for the software coalition chain address and the correlated software coalition chain address.

In an embodiment of the method of attesting, examining and quickly tracing a software bill of materials according to the disclosure, one of a software supplier, a software integration administrator and a software security administrator registers with the coalition chain to gain right to access the coalition chain and become a coalition member of the coalition chain.

In an embodiment of the method of attesting, examining and quickly tracing a software bill of materials according to the disclosure, the coalition chain has therein multiple trust channels for admitting the coalition member into at least one authorized trust channel to share data and isolating coalition members of different trust channels, and the software coalition chain address is assigned to the software content identifier, allowing the software content identifier to be written to an assigned trust channel in the coalition chain.

In an embodiment of the method of attesting, examining and quickly tracing a software bill of materials according to the disclosure, the coalition chain uses a chain code to integrate correlated software coalition chain addresses and software content identifiers and generate a trustworthy set software coalition chain address.

In an embodiment of the method of attesting, examining and quickly tracing a software bill of materials according to the disclosure, the correlated software information comprises at least one software component information and at least one preceding generation software information, and the correlated software coalition chain address comprises at least one software component coalition chain address and at least one preceding generation software information coalition chain address.

In an embodiment of the method of attesting, examining and quickly tracing a software bill of materials according to the disclosure further comprises, after the coalition chain has attested the software content identifier and a corresponding software coalition chain address, the steps of: acquiring, by the decentralized application module, a software coalition chain address of a software artifact information to be traced and examined, and a software component coalition chain address or a preceding generation software information coalition chain address; acquiring, by the decentralized application module, the software content identifier corresponding to the software coalition chain address from the coalition chain; acquiring, by the decentralized application module, the integration software bill of materials and the hash tree tracing data from the InterPlanetary File System according to the acquired software content identifier; treating, by the decentralized application module through the tracing data creating module, at least one leaf node path data of the acquire hash tree tracing data and the software component coalition chain address to be traced and examined or a preceding generation software information coalition chain address as a leaf node and perform computation to generate a root hash value; and comparing, by the decentralized application module, the root hash value of the acquired hash tree tracing data and the root hash value of the hash tree tracing data to be traced and examined.

A system of attesting, examining and quickly tracing a software bill of materials, the system comprising at least one electronic device, the coalition chain, the InterPlanetary File System and the matching database, wherein execution of the electronic device, the coalition chain, the InterPlanetary File System and the matching database causes the system to execute any one of the embodiments of the method of attesting, examining and quickly tracing a software bill of materials.

In an embodiment of the system of attesting, examining and quickly tracing a software bill of materials according to the disclosure, the electronic device is a coalition member node apparatus of the coalition chain, and the coalition member is one of a software supplier, software integration administrator, and software security administrator.

DETAILED DESCRIPTION

Figure 1:
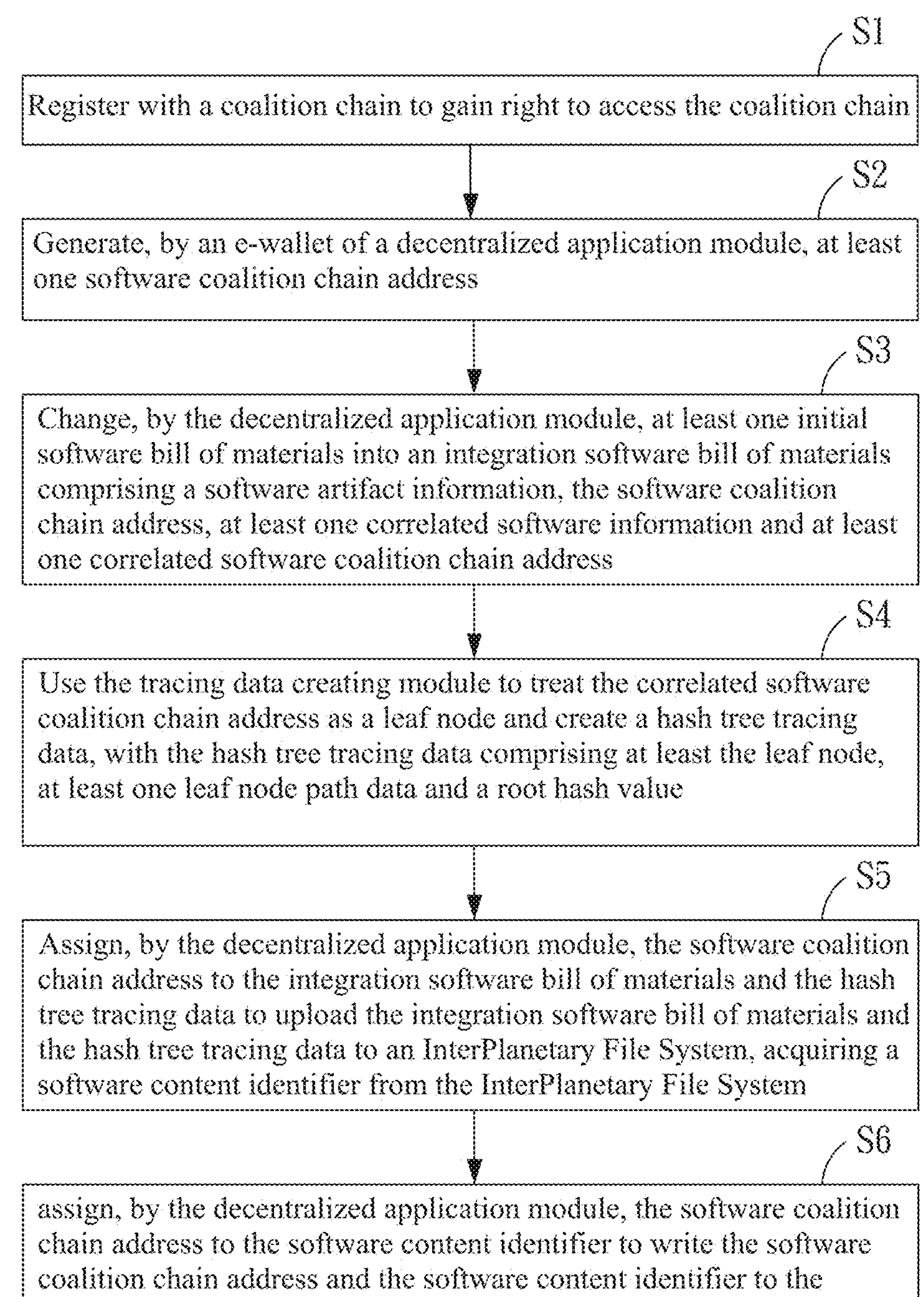
FIG. 1 is a schematic view of an attesting process flow of a method of attesting, examining and quickly tracing a software bill of materials according to the disclosure.

The aforesaid objectives, structural features and functional features of the disclosure are illustrated by preferred embodiments depicted by the accompanying drawings and described below.

The structures and technical features of a method and system of attesting, examining and quickly tracing a software bill of materials are illustrated by various applicable embodiments for exemplary purposes, depicted by the accompanying drawings, and described below in detail. However, the exemplary embodiments, accompanying drawings and description are not restrictive of the disclosure.

Persons skilled in the art understand that the exemplary embodiments and the accompanying drawings are illustrative in terms of reference and description rather than restrictive of the disclosure. Persons skilled in the art can make simple modifications and changes to the embodiments to accomplish the disclosure, and the modifications and changes shall be deemed falling within the scope of the disclosure without departing from the spirit and objectives of the disclosure. The scope of the disclosure shall be defined by the appended claims of the disclosure.

Direction-related terms, such as "upper", "lower", "left", "right", "front" and "rear", used in the embodiments refer to the directions depicted in the accompanying drawings and thus are illustrative rather than restrictive of the disclosure. Identical or similar reference numerals used in the embodiments denote identical or similar components.

Figure 2:
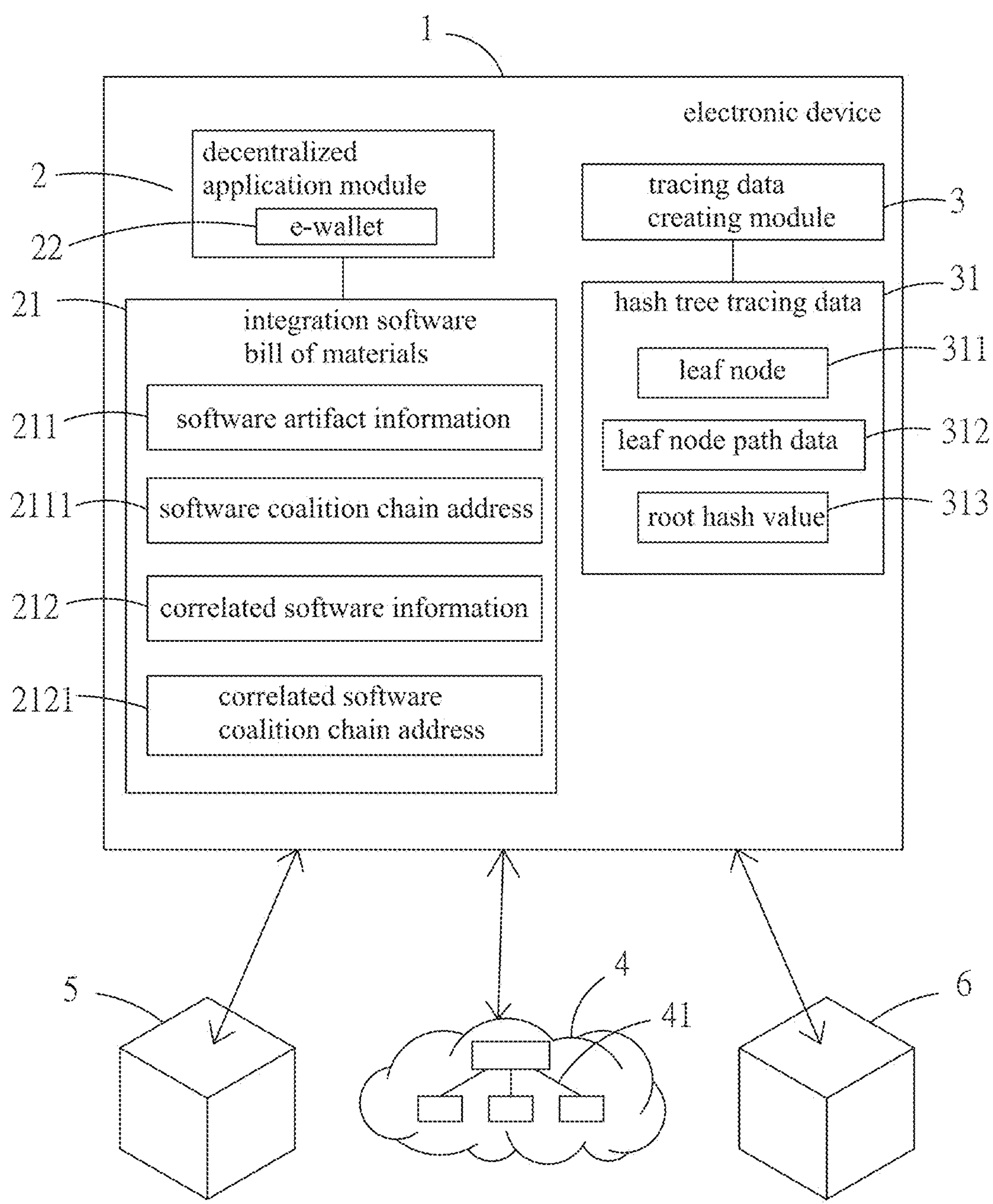
FIG. 2 is a block diagram of a system of attesting, examining and quickly tracing a software bill of materials according to the disclosure.

Referring to FIG. 1 and FIG. 2, there are shown a schematic view of an attesting process flow of a method of attesting, examining and quickly tracing a software bill of materials according to the disclosure and a block diagram of a system of attesting, examining and quickly tracing a software bill of materials according to the disclosure respectively. The method of attesting, examining and quickly tracing a software bill of materials comprises the steps as follows:

Step S1: Register with a coalition chain to gain right to access the coalition chain. One of a software supplier, a software integration administrator and a software security administrator uses an electronic device 1 to register with a coalition chain 4. The software supplier is a software developer; the software developer produces software artifacts and provides a software bill of materials of the software artifacts. The software integration administrator is a software integrator; the software integrator integrates at least one software artifact, produces integration software artifacts and provides a software bill of materials of the integration software artifacts. The software security administrator is a system operator; the system operator is an integrated software material buyer. One of the software supplier, the software integration administrator and the software security administrator has to use the electronic device 1 to register with the coalition chain 4 to acquire a username and a password to gain right to access the coalition chain 4 and become a coalition member of the coalition chain 4.

One of the software supplier, the software integration administrator and the software security administrator creates multiple trust channels 41 in the coalition chain 4. In this embodiment, the software integration administrator creates the trust channels 41 in the coalition chain 4 and invites the software supplier or the software security administrator to enter the created trust channels 41 to not only allow the coalition members to share data in the trust channels 41 but also isolate the coalition members of different trust channels 41. The electronic device 1 is an electronic apparatus or computer. Each electronic device 1 is a coalition member node apparatus of the coalition chain 4.

The trust channels 41 are created to fulfill different purposes respectively and mainly created by the software integration administrator. For example, when a software security administrator A uses, for example, wants to use, is going to use, is ready to use, has used, is using, and will use, unmanned aerial vehicle system software and unmanned surface vessel system software, an unmanned aerial vehicle system software integration administrator creates an unmanned aerial vehicle system software trust channel 41 and invites the software security administrator A and one or more unmanned aerial vehicle software suppliers to join the same trust channel 41, whereas an unmanned surface vessel system software integration administrator creates an unmanned surface vessel system software trust channel 41*c* and invites the software security administrator A and one or more unmanned surface vessel software suppliers to join the same trust channel 41. In other words, the unmanned aerial vehicle software integration administrator adds one or more unmanned aerial vehicle software suppliers and the software security administrator A to the same trust channel 41, whereas the coalition members in the trust channels 41 attest the coalition chain 4 in the trust channels 41 to not only allow the coalition members to share data in the same trust channel 41 but also isolate the coalition members of different trust channels 41.

Step S2: Generate, by an e-wallet of a decentralized application module 2, at least one software coalition chain address. The decentralized application module 2 and a tracing data creating module 3 are mounted on the electronic device 1. The decentralized application module 2 is, for example, the decentralized application module 2 of a decentralized application (DApp). The decentralized application module 2 comprises an e-wallet 22 and generates multiple software coalition chain addresses through the e-wallet 22. Thus, the coalition member acquires a software coalition chain address 2111 through the e-wallet 22 of the decentralized application module 2. The tracing data creating module 3 is an application that uses hash tree (also known as Merkle tree) technology.

Figure 3:
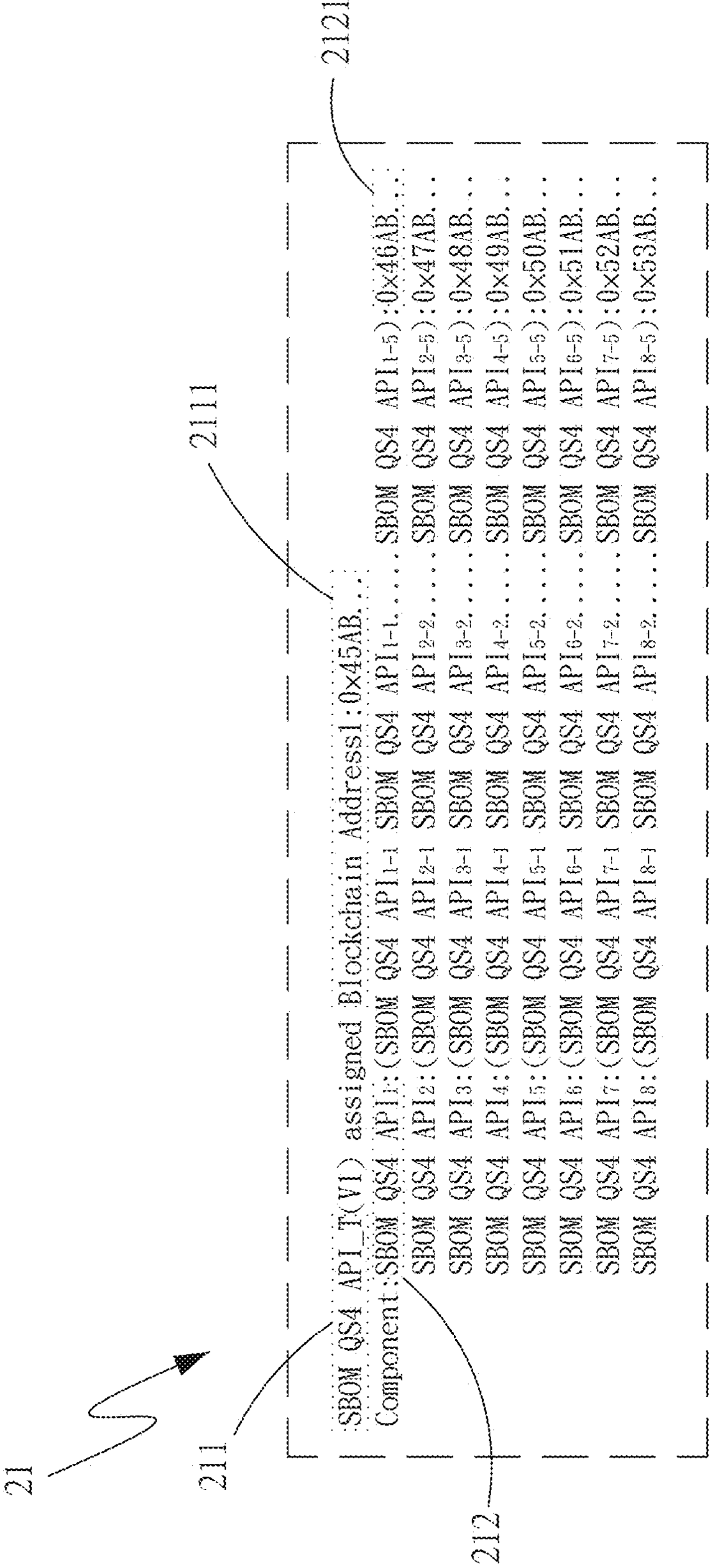
FIG. 3 is a schematic view of an integration software bill of materials according to the disclosure.

Step S3: Change, by the decentralized application module 2, at least one initial software bill of materials into an integration software bill of materials comprising a software artifact information, the software coalition chain address, at least one correlated software information and at least one correlated software coalition chain address. The coalition member has already created at least one initial software bill of materials according to its software artifacts, and its initial software bill of materials is an SBOM table (SBOM is in existing common formats, such as SPDX, SWID, CycloneDX) that must be conventionally provided and must at least comply with the basis rule set forth by the National Telecommunications and Information Administration, NTIA, the USA regarding creating the minimal standard SBOM (software bill of materials, comprising a supplier name, software package name, package version, any other identifiable package ID, software supply chain relation, SBOM author, SBOM time or a combination thereof. The software artifacts of the software supplier are a correlated software (i.e., software correlated to software artifacts of the software integration administrator) of the software integration administrator. Thus, before the system is used by the software integration administrator, an initial bill of materials of software artifacts is linked by the software supplier through the decentralized application module 2 to a software artifact information 211 and software coalition chain address 2111 to generate the integration software bill of materials 21, and the integration software bill of materials 21 is stored in a matching database 6. The integration software bill of materials 21 stored in the matching database 6 is intended to become one of the sources of a correlated software coalition chain address 2121. When the coalition member is the software integration administrator, the software integration administrator changes the initial bill of materials of the software artifacts into the integration software bill of materials 21 through the decentralized application module 2. The integration software bill of materials 21 comprises the software artifact information 211, the software coalition chain address 2111, correlated software information 212 and correlated software coalition chain address 2121, wherein the software artifact information 211 includes a software name, software version or information exclusive to the software artifacts and shown in the SBOM table. The correlated software information 212 is software components of the software artifacts of the software integration administrator or their predecessors. The software artifact information 211 of N preceding generation software (N denotes a natural number greater than or equal to 1) and the correlated software information 212 are in a plural number. The correlated software coalition chain address 2121 is the coalition chain address corresponding to the software information of correlated software. The decentralized application module 2 is linked to the software artifact information 211 and the software coalition chain address 2111. The correlated software coalition chain address 2121 corresponding to the correlated software information 212 is retrieved from the matching database 6. Furthermore, the correlated software coalition chain address 2121 is directly provided by the software supplier to the software integration administrator. The software integration administrator uses the decentralized application module 2 to create the integration software bill of materials 21 (shown in FIG. 3) from the initial software bill of materials, and the integration software bill of materials 21 comprises the software information 211, the software coalition chain address 2111, the correlated software information 212 of the integrated software, and the correlated software coalition chain address 2121.

Figure 4:
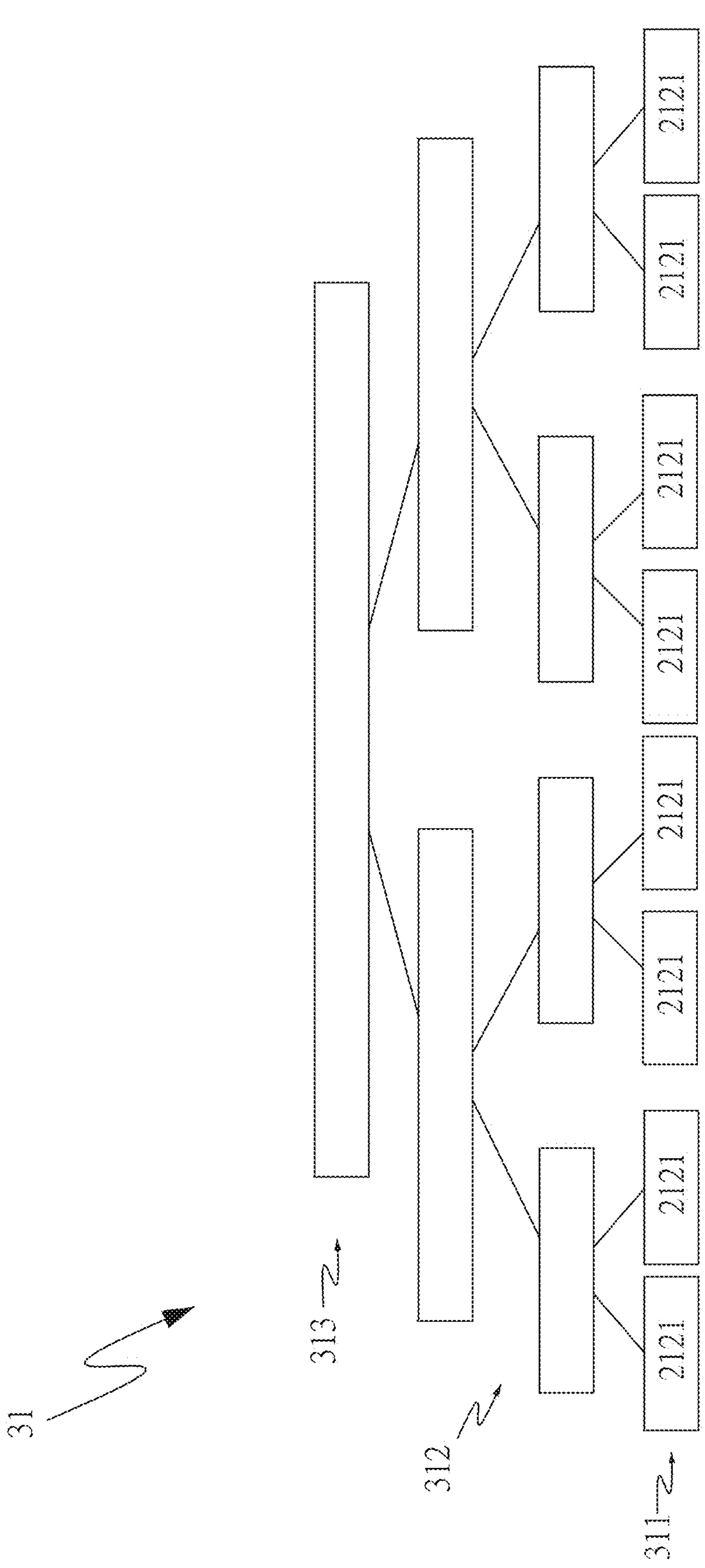
FIG. 4 is a first schematic view of hash tree tracing data according to the disclosure.

Step S4: Use the tracing data creating module 3 to treat the correlated software coalition chain address as a leaf node and create a hash tree tracing data. The hash tree tracing data comprises at least the leaf node, at least one leaf node path data and a root hash value. A coalition member serving as a software integration administrator or system operator acquires the correlated software coalition chain address 2121 of the integration software bill of materials 21 and uses the tracing data creating module 3 to create a hash tree tracing data 31 (shown in FIG. 4) of the software information 211 at the correlated software coalition chain address 2121 functioning as the leaf node 311. The hash tree tracing data 31 comprises the leaf node 311, at least one leaf node path data 312 and a root hash value 313. Optionally, the leaf node at which the hash tree tracing data 31 is created comprises the software coalition chain address 2111, and a hash encryption algorithm for generating the hash tree tracing data 31 is post-quantum cryptography.

The hash tree tracing data 31 is created by the leaf nodes according to a sequence rule. The sequence rule requires searching the software coalition chain address and a correlated software coalition chain address and comparing the words of each address, from the starting word to the final word, from the least number to the greatest number, from a to z among lower case letters of the alphabet, and from A to Z among upper case letters of the alphabet. If the same alphanumeric appears at the same position, the next word will be compared to perform sorting, achieving a leaf node sequence (from left to right) in a hash tree for the software coalition chain address and the correlated software coalition chain address.

Step S5: Assign, by the decentralized application module 2, the software coalition chain address to the integration software bill of materials and the hash tree tracing data 31 to upload the software coalition chain address, the integration software bill of materials and the hash tree tracing data 31 to an InterPlanetary File System, acquiring a software content identifier from the InterPlanetary File System. After the electronic device 1 has acquired the integration software bill of materials 21 and the hash tree tracing data 31, its coalition member uses the decentralized application module 2 to assign the software coalition chain address 2111 to the integration software bill of materials 21 and the hash tree tracing data 31 and upload the software coalition chain address 2111, the integration software bill of materials 21 and the hash tree tracing data 31 to the InterPlanetary File System 5. After receiving the integration software bill of materials 21, the hash tree tracing data 31 and the software coalition chain address 2111, the InterPlanetary File System 5 generates a software content identifier (CID). The decentralized application module 2 acquires the software content identifier of the integration software bill of materials 21 and the hash tree tracing data 31 from the InterPlanetary File System 5. The coalition member acquires the software content identifier through the decentralized application module 2. The integration software bill of materials 21 and the hash tree tracing data 31 are not only uploaded to the InterPlanetary File System 5 but also stored in the electronic device 1.

Step S6: assign, by the decentralized application module 2, the software coalition chain address to the software content identifier to write the software coalition chain address and the software content identifier to the coalition chain to allow the coalition chain to attest the software content identifier and a corresponding software coalition chain address, allowing the integration software bill of materials, the hash tree tracing data 31, the software content identifier and software coalition chain address to be stored in a matching database. After the electronic device 1 has received the software content identifier from the InterPlanetary File System 5, the decentralized application module 2 assigns the software coalition chain address 2111 to the software content identifier and then writes the software coalition chain address 2111 and the software content identifier to the coalition chain 4 to allow the coalition chain 4 to attest the software content identifier and a corresponding software coalition chain address 2111. The decentralized application module 2 stores the integration software bill of materials, the hash tree tracing data 31, the software content identifier and the software coalition chain address in a matching database 6. Afterwards, the software coalition chain address 2111 in the matching database 6 can function as the correlated software coalition chain address in any other integration software bill of materials. Therefore, the coalition chain 4 and the InterPlanetary File System 5 cannot be tampered with but exhibit impartiality, allowing software materials to be attested.

The correlated software coalition chain address 2121 originates from the software coalition chain address 2111 of the members of steps S2~S6. During the process of constructing the system, a software supplier attests data in the coalition chain 4, the InterPlanetary File System 5 and the matching database 6 in steps S2~S6. The software integration administrator uses the system and method to acquire, through the decentralized application module 2, the software coalition chain address 2111 stored in the matching database 6 such that the software coalition chain address 2111 functions as the correlated software coalition chain address 2121 for attesting data in the current attesting instance. For example, if software X comprises correlated software information A, B and C, then an initial software bill of materials of software X comprises software information of software X and software information of information A, B and C each (at this point in time, the correlated software information A, B and C has already undergone an attesting operation). In step S3, the decentralized application module 2 not only integrates the coalition chain address 2111 of software X with the software information of software X but also acquires from the matching database 6 the software coalition chain address 2111 of the software information of the software A, B and C to treat the software coalition chain address 2111 as the correlated software coalition chain address 2121 of software X. Alternatively, the software supplier of the software A, B and C provides the software coalition chain address 2111 of the software A, B and C and treats the software coalition chain address 2111 of the software A, B and C as the correlated software coalition chain address 2121 of software X such that the integrated bill of materials 12 comprises software information 211, software coalition chain address 2111, correlated software information 212 and correlated software coalition chain address 2121.

The coalition chain 4 has a chain code capable of reconfiguring the software coalition chain address 2111 of different versions of the trustworthy software artifact information 211 and the correlated software coalition chain address 2121 of the correlated software information 212 or a hash tree formed through computation of the elements of the aforesaid union set. After the coalition chain 4 has attested the software content identifier and a corresponding software coalition chain address 2111, its chain code integrates all the software coalition chain addresses 211 of correlated sets to become a trust chain union set of each of the different versions of an identifiable software artifact. The chain code integrates the correlated software coalition chain addresses 211 to generate a trustworthy set software coalition chain address. The trustworthy set software coalition chain address is a trust union set of the software coalition chain address 211, also known as a trust chain set in a channel of a coalition chain. The trustworthy set software coalition chain address functions as the only verifiable identification address provided relative to a version of the software bill of materials. When the correlated software information 212 or the contents of the trust chain set in the channels of the coalition chain 4 is updated to become a new version, the trustworthy set software coalition chain address is assigned for a new trustworthy set software coalition chain address because of the update of the contents of the trust chain set correlated with the software information. The trustworthy set software coalition chain address is not only regarded as a set of the software coalition chain address and the correlated software coalition chain address but also used to create quickly-traceable data by means of a hash tree. The coalition member uses the trustworthy set software coalition chain address to search the chain code for the related software coalition chain address 211.

When the electronic device 1, the InterPlanetary File System 5 and the coalition chain 4 are matched through post-quantum cryptography. For example, lattice-based cryptography, Learning with Errors (LWE), multivariate cryptography, hash cryptography, code-based cryptography, and supersingular elliptic curve isogeny cryptography are employed to affix signatures, examine signatures, perform encryption, perform decryption, and perform computation to ensure information transport security.

Figure 5:
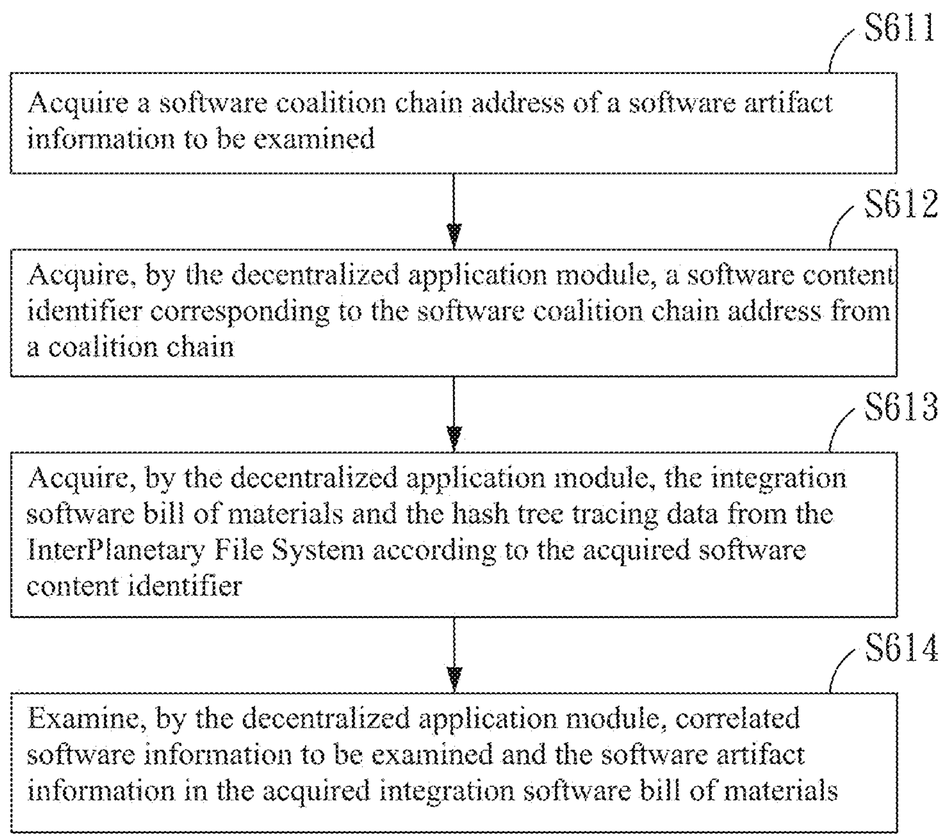
FIG. 5 is a schematic view of an examining process flow of the method of attesting, examining and quickly tracing a software bill of materials according to the disclosure.

Referring to the aforesaid diagrams and FIG. 5, there is shown a schematic view of an examining process flow of the method of attesting, examining and quickly tracing a software bill of materials according to the disclosure. As shown in FIG. 5, step S6 is followed by the steps as follows:

Step S611: Acquire a software coalition chain address of a software artifact information to be examined. The aforesaid step of attesting the software bill of materials is followed by an examining process flow in which a coalition member acquires the software coalition chain address 2111 of the software artifact information 211 to be examined in order to examine the software artifact information 211 to be examined.

Step S612: Acquire, by the decentralized application module 2, a software content identifier corresponding to the software coalition chain address from the coalition chain; after the software coalition chain address 2111 of the software artifact information 211 to be examined has been acquired, the decentralized application module 2 sends the software coalition chain address 2111 to the coalition chain 4 and acquires from the coalition chain 4 the software content identifier corresponding to the software coalition chain address 2111.

Step S613: Acquire, by the decentralized application module 2, the integration software bill of materials and the hash tree tracing data 31 from the InterPlanetary File System 5 according to the acquired software content identifier. After the coalition member has acquired the software content identifier corresponding to the software coalition chain address 2111 through the decentralized application module 2, the decentralized application module 2 sends the acquired software content identifier to the InterPlanetary File System 5 such that the integration software bill of materials 21 and the hash tree tracing data 31 of the software content identifier can be acquired from the InterPlanetary File System 5.

Step S614: Examine, by the decentralized application module 2, correlated software information to be examined and the software artifact information in the acquired integration software bill of materials; after the integration software bill of materials 21 corresponding to the software content identifier and the hash tree tracing data 31 have been acquired by the decentralized application module 2, the decentralized application module 2 compares the software artifact information 211 in the integration software bill of materials 21 with the software artifact information 211 to be examined to determine whether they are identical, wherein an affirmative determination is followed by identifying the software artifacts material to be examined and finishing the examination. The coalition chain 4 and the InterPlanetary File System 5 cannot be tampered with but exhibit impartiality to allow software materials to be examined, and thus it can be confirmed that the software artifact information 211 is the correct contents originally attested.

Figure 6:
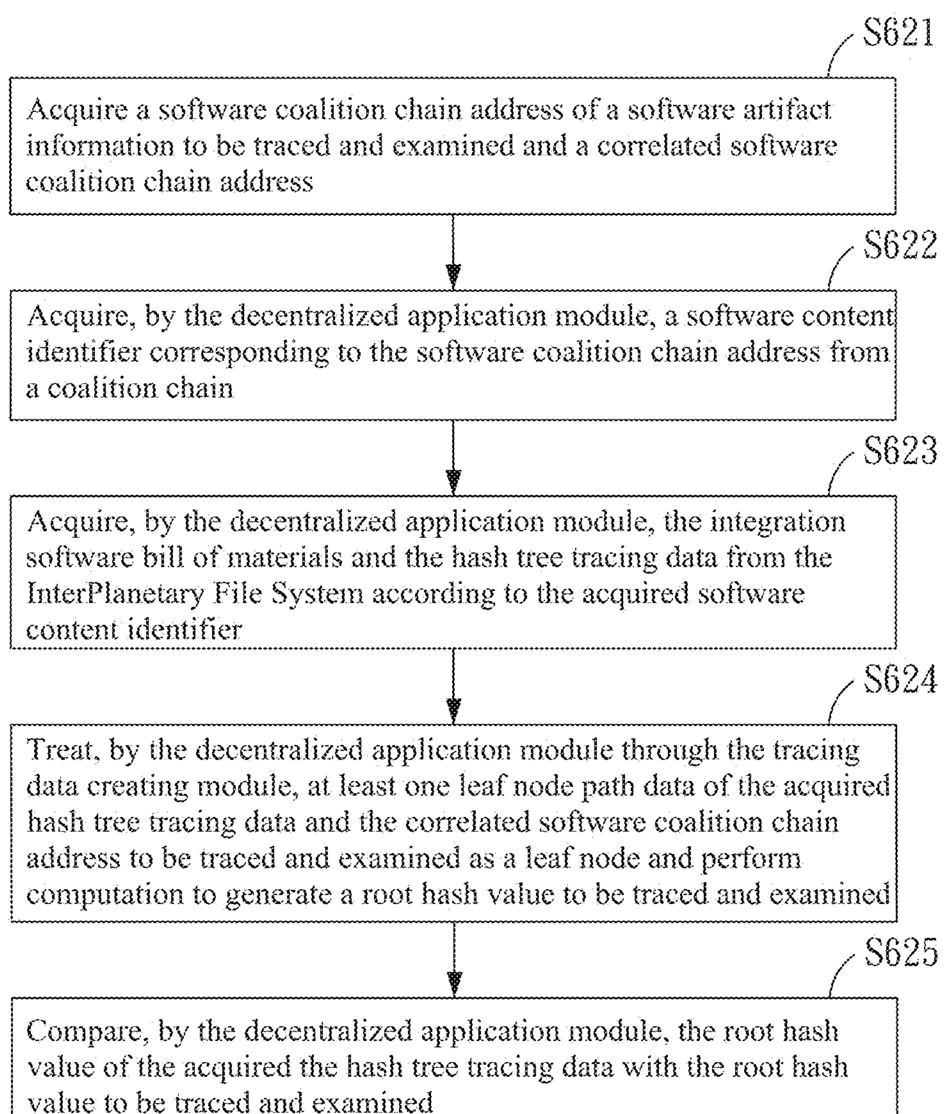
FIG. 6 is a schematic view of a tracing and examining process flow of the method of attesting, examining and quickly tracing a software bill of materials according to the disclosure.

Referring to the aforesaid diagrams and FIG. 6, there is shown a schematic view of a tracing and examining process flow of the method of attesting, examining and quickly tracing a software bill of materials according to the disclosure. Step S6 is followed by the steps as follows:

Step S621: Acquire a software coalition chain address of a software artifact information to be traced and examined and a correlated software coalition chain address. The aforesaid step of attesting a software material is followed by a tracing & examining process flow in which a coalition member acquires the software coalition chain address 2111 of the software artifact information 211 to be traced and examined and the correlated software coalition chain address 2121 in order to determine whether the correlated software information 212 to be traced and examined is applicable to the software artifact information 211.

Step S622: Acquire, by the decentralized application module 2, a software content identifier corresponding to the software coalition chain address from a coalition chain; after the coalition member has acquired the software coalition chain address 2111 of the software artifact information 211 to be traced and examined, the coalition member uses the decentralized application module 2 to send the software coalition chain address 2111 to the coalition chain 4 and acquire from the coalition chain 4 the software content identifier corresponding to the software coalition chain address 2111 to be traced and examined.

Step S623: Acquire, by the decentralized application module 2, the integration software bill of materials and the hash tree tracing data 31 from the InterPlanetary File System 5 according to the acquired software content identifier; the coalition member uses the decentralized application module 2 to acquire the software content identifier corresponding to the software coalition chain address 2111, and then the decentralized application module 2 sends the acquired software content identifier to the InterPlanetary File System 5 such that the integration software bill of materials 21 and the hash tree tracing data 31 corresponding to the software content identifier can be acquired from the InterPlanetary File System 5.

Step S624: Treat, by the decentralized application module 2 through the tracing data creating module 3, at least one leaf node path data of the acquired hash tree tracing data 31 and the correlated software coalition chain address to be traced and examined as a leaf node and perform computation to generate a root hash value to be traced and examined; the coalition member uses the decentralized application module 2 to acquire the integration software bill of materials 21 and the hash tree tracing data 31 corresponding to the software content identifier, and then the decentralized application module 2 uses the tracing data creating module 3 to create from the acquired leaf node path data and leaf node a root hash value to be traced and examined.

Step S625: Compare, by the decentralized application module 2, the root hash value of the acquired the hash tree tracing data 31 with the root hash value to be traced and examined; after the decentralized application module 2 has acquired the root hash value 313 to be traced and examined, the decentralized application module 2 compares the root hash value 313 of the acquired hash tree tracing data 31 and the root hash value 313 to be traced and examined to determine whether they are identical, wherein an affirmative determination is followed by tracing, examining and determining whether the correlated software information 212 corresponding to the correlated software coalition chain address 2121 to be traced and examined is applicable to the software bill of materials. The coalition chain 4 and the InterPlanetary File System 5 cannot be tampered with but exhibit impartiality to allow software materials to be traced and examined, and thus it can be confirmed whether the correlated software information 212 to be traced and examined is information in the software artifact information 211 or not.

Figure 7:
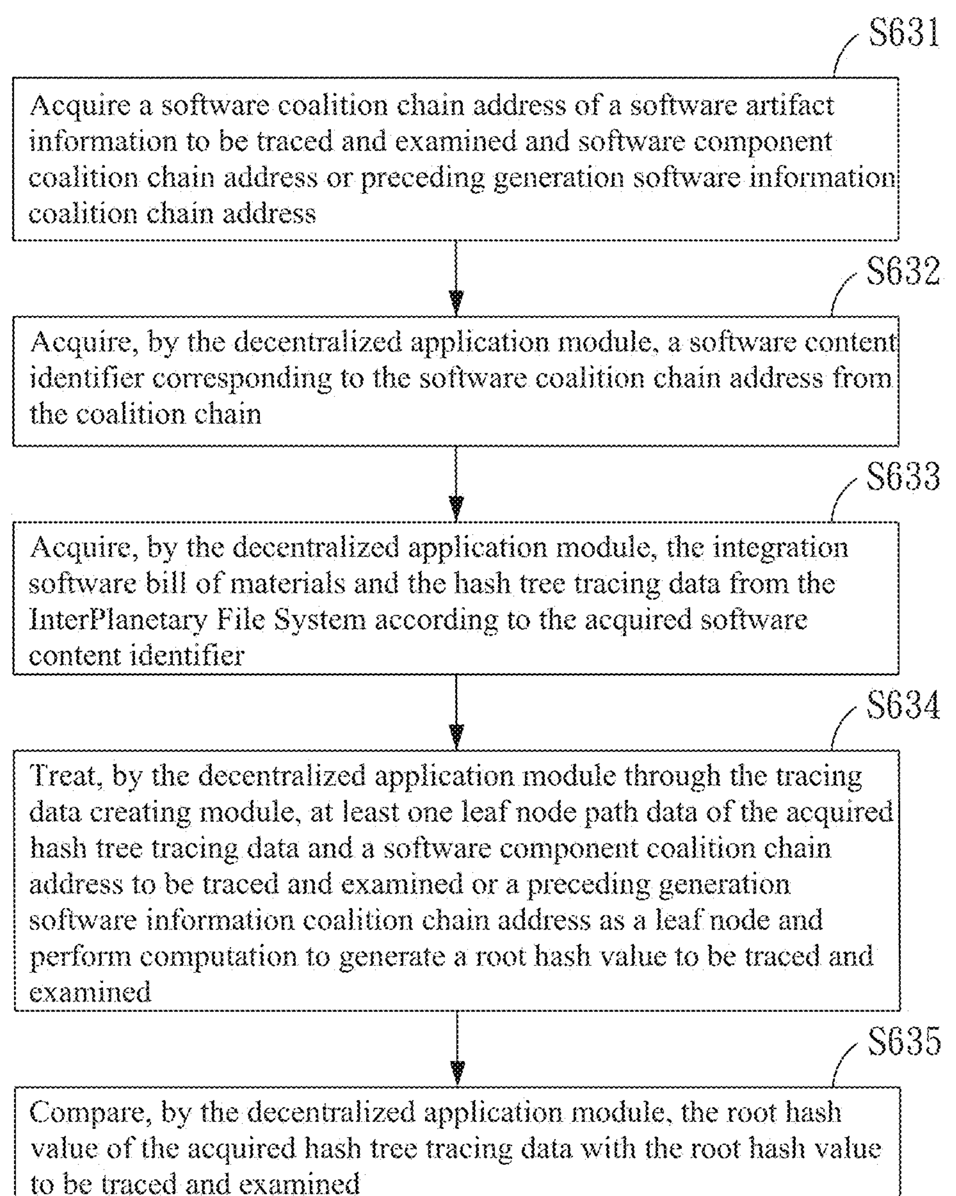
FIG. 7 is a schematic view of another tracing and examining process flow of the method of attesting, examining and quickly tracing a software bill of materials according to the disclosure.
Figure 8:
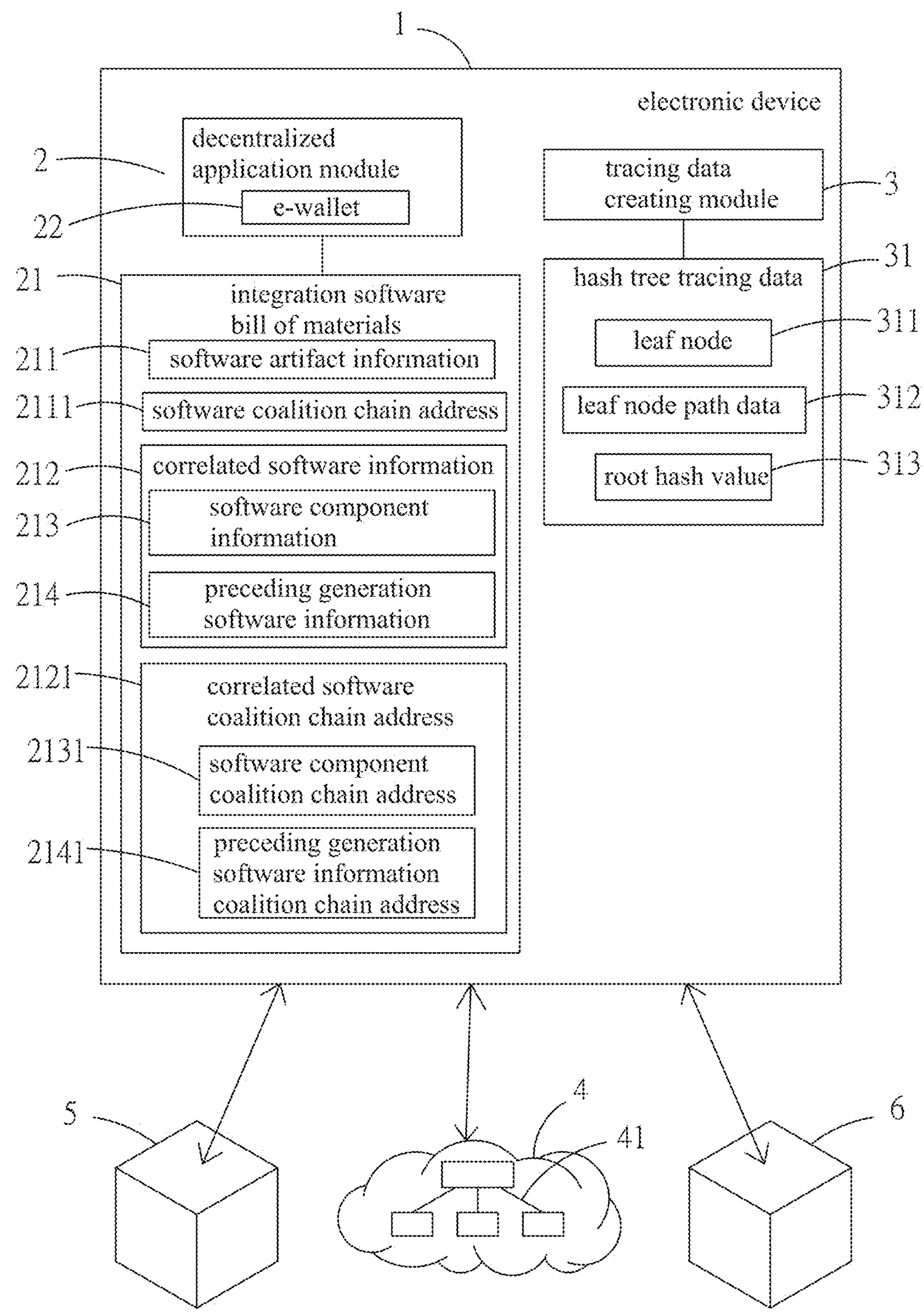
FIG. 8 is another block diagram of the system of attesting, examining and quickly tracing a software bill of materials according to the disclosure.
Figure 9:
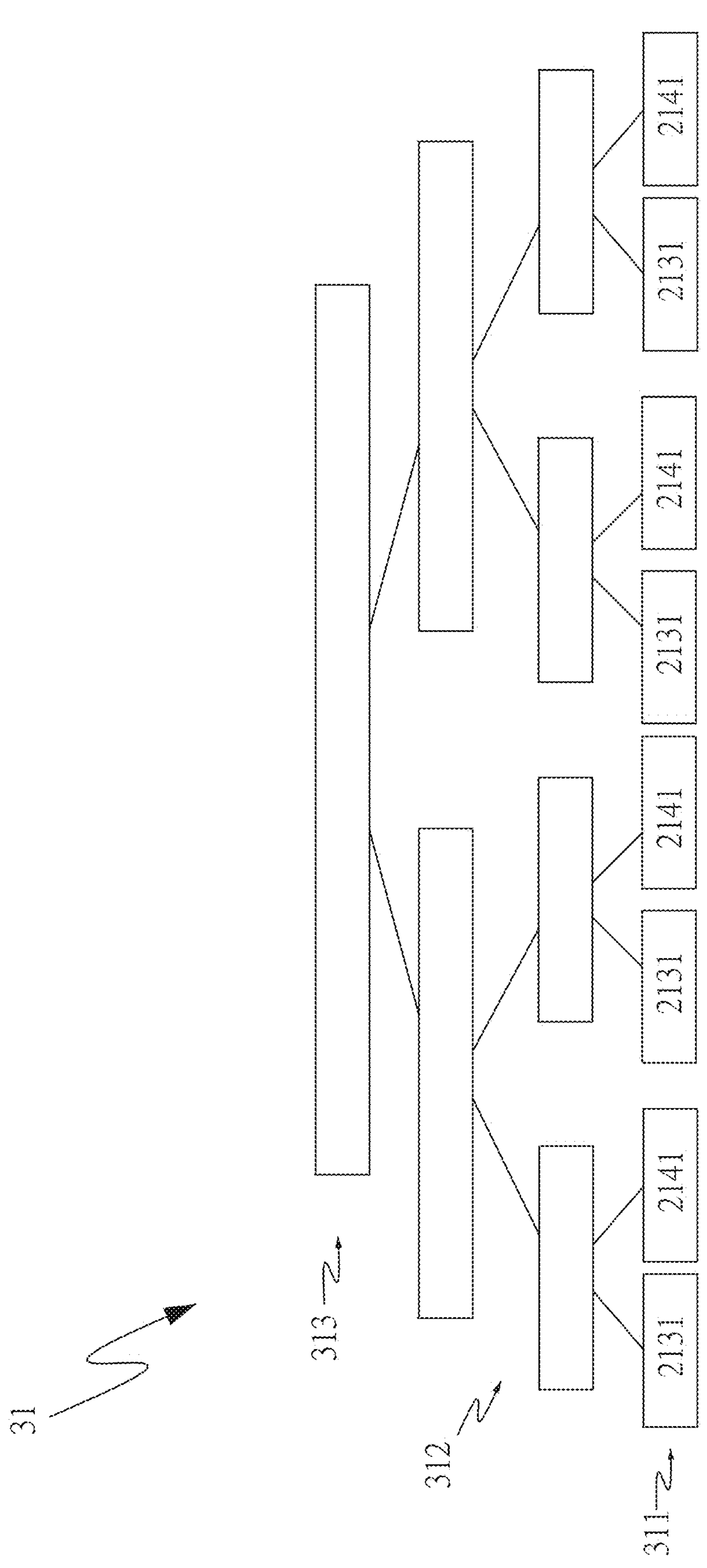
FIG. 9 is a second schematic view of hash tree tracing data according to the disclosure.

Referring to FIG. 7, FIG. 8 and FIG. 9, there are shown a schematic view of another tracing and examining process flow of the method of attesting, examining and quickly tracing a software bill of materials according to the disclosure, another block diagram of the system of attesting, examining and quickly tracing a software bill of materials according to the disclosure, and a second schematic view of the hash tree tracing data 31 according to the disclosure, respectively. The software artifact information 211 and software coalition chain address 2111 of the software supplier are the correlated software information 212 and correlated software coalition chain address 2121 of the software integration administrator. The correlated software information 212 comprises at least one software component information 213 and at least one preceding generation software information 214. The correlated software coalition chain address 2121 comprises at least one software component coalition chain address 2131 and at least one preceding generation software information coalition chain address 2141. The software component information 213 is the information about the software for use in the current instance of integration software. The preceding generation software information 214 is the preceding generation software information or several preceding generation software information about the current instance of integration software and application software. The tracing data creating module 3 uses the software component coalition chain address 2131 and the preceding generation software information coalition chain address 2141 as the leaf node 311 for use in creating the hash tree tracing data 31. Step S6 is followed by steps described below.

Step S631: Acquire a software coalition chain address of a software artifact information to be traced and examined and software component coalition chain address or preceding generation software information coalition chain address; the aforesaid step of attesting a software material is followed by a tracing and examining process flow in which the coalition member acquires the software coalition chain address 2111 of the software artifact information 211 to be traced and examined and the software component coalition chain address 2131 or a preceding generation software information coalition chain address 2141 in order to determine whether a software component information 213 to be traced and examined or a preceding generation software information 214 is applicable to the software artifact information 211.

Step S632: Acquire, by the decentralized application module 2, a software content identifier corresponding to the software coalition chain address from the coalition chain; after the coalition member has acquired the software coalition chain address 2111 of the software artifact information 211 to be traced and examined, the coalition member uses the decentralized application module 2 to send the software coalition chain address 2111 to the coalition chain 4 and acquire a software content identifier corresponding to the software coalition chain address 2111 to be traced and examined from the coalition chain 4.

Step S633: Acquire, by the decentralized application module 2, the integration software bill of materials and the hash tree tracing data 31 from the InterPlanetary File System 5 according to the acquired software content identifier; the coalition member uses the decentralized application module 2 to acquire the software content identifier corresponding to the software coalition chain address 2111, and then the decentralized application module 2 sends the acquired software content identifier to the InterPlanetary File System 5 such that the integration software bill of materials 21 and the hash tree tracing data 31 corresponding to the software content identifier are acquired from the InterPlanetary File System 5.

Step S634: Treat, by the decentralized application module 2 through the tracing data creating module 3, at least one leaf node path data of the acquired hash tree tracing data 31 and a software component coalition chain address to be traced and examined or a preceding generation software information coalition chain address as a leaf node and perform computation to generate a root hash value to be traced and examined; the coalition member uses the decentralized application module 2 to acquire the integration software bill of materials 21 and the hash tree tracing data 31 corresponding to the software content identifier, and then the decentralized application module 2 creates a root hash value to be traced and examined from the acquired leaf node path data and a software component coalition chain address or a preceding generation software information coalition chain address 2141 through the tracing data creating module 3.

Step S635: Compare, by the decentralized application module 2, the root hash value of the acquired hash tree tracing data 31 with the root hash value to be traced and examined; after the decentralized application module 2 has acquired the root hash value 313 to be traced and examined, the decentralized application module 2 compares the root hash value 313 of the acquired hash tree tracing data 31 with the root hash value 313 to be traced and examined to determine whether they are identical, wherein an affirmative determination is followed by tracing, examining and determining whether the software component coalition chain address 2131 to be traced and examined, a software component information 213 corresponding to a preceding generation software information coalition chain address 2141, and a preceding generation software information 214 are applicable to the software bill of materials. The coalition chain 4 and the InterPlanetary File System 5 cannot be tampered with but exhibit impartiality to allow software materials to be traced and examined, and thus it can be confirmed whether the software component information 213 and the preceding generation software information 214 are information in the software artifact information 211 or not.

Figure 10:
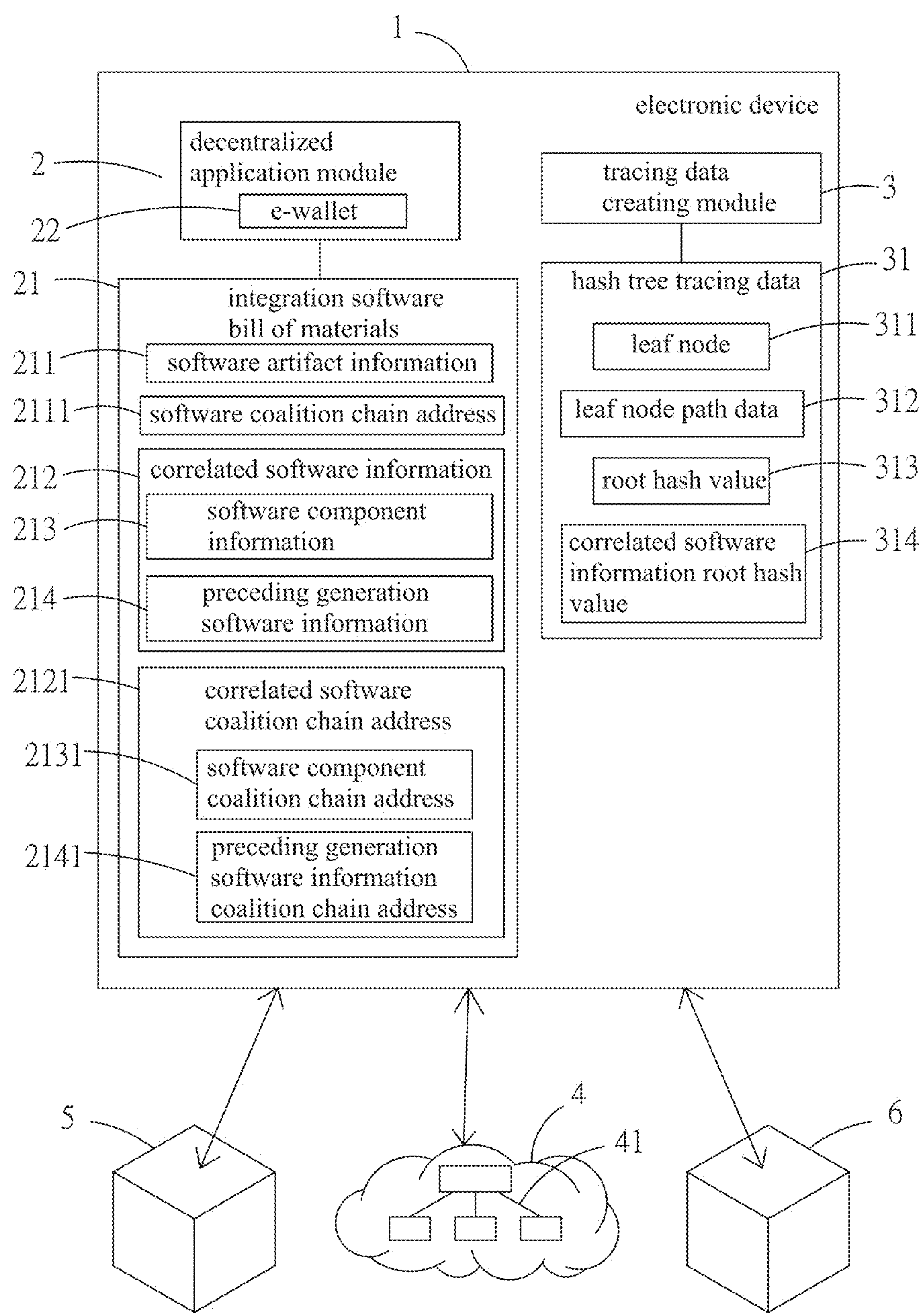
FIG. 10 is yet another block diagram of the system of attesting, examining and quickly tracing a software bill of materials according to the disclosure.
Figure 11:
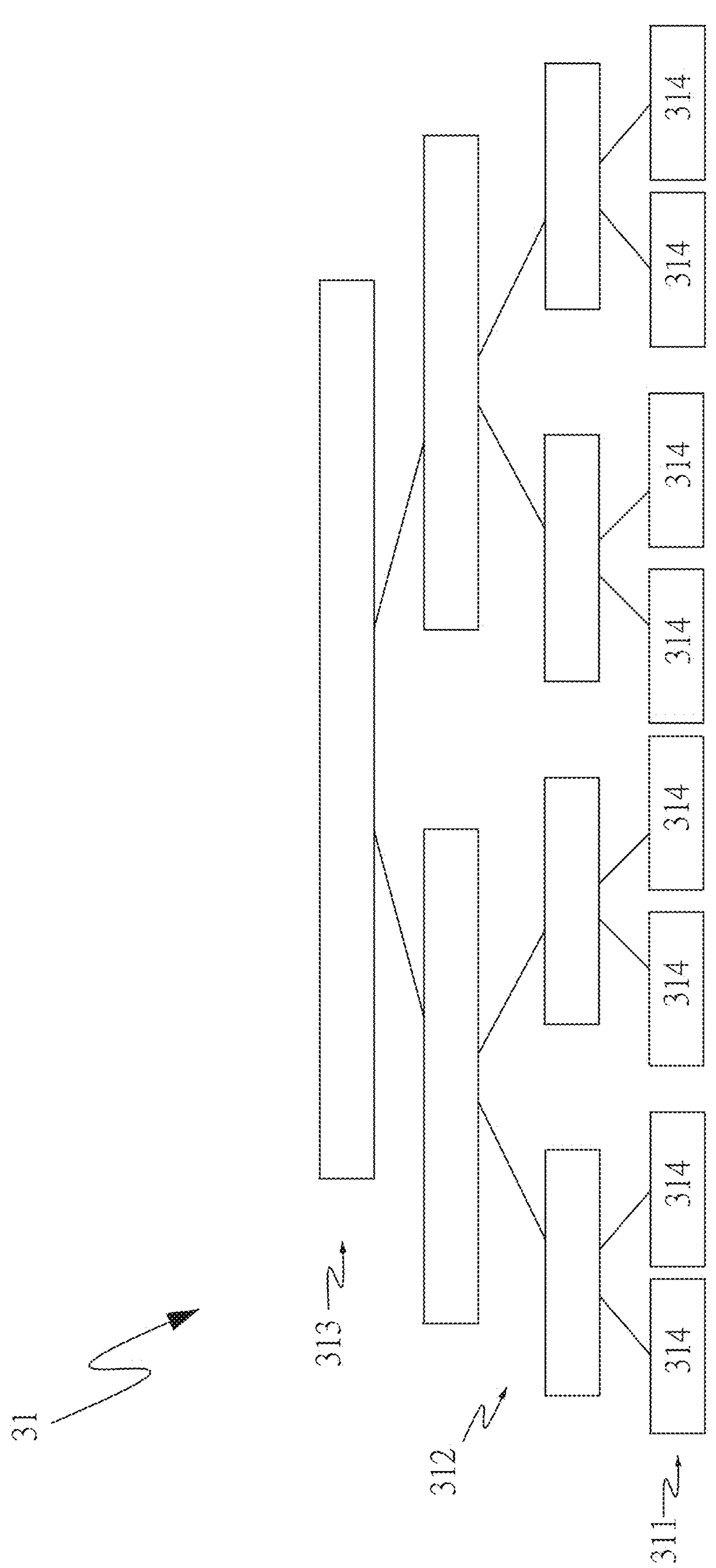
FIG. 11 is a third schematic view of hash tree tracing data according to the disclosure.

Referring to FIG. 10 and FIG. 11, there are shown yet another block diagram of the system of attesting, examining and quickly tracing a software bill of materials according to the disclosure and a third schematic view of the hash tree tracing data 31 according to the disclosure. In step S4, the tracing data creating module 3 uses correlated software information root hash value as a leaf node for use in creating a hash tree tracing data. After the software supplier or software integration administrator has finished storing data in the matching database 6, the matching database 6 has the root hash value 313 corresponding to each software artifact. The root hash value 313, i.e., a correlated software information root hash value 314, functions as a leaf node for use in creating a hash tree tracing data, for example, when the software X comprises correlated software information A, B and C (at this point in time, correlated software A, B and C have undergone the attesting operation.) In step S3, the decentralized application module 2 acquires from the matching database 6 the root hash value 313 previously stored therein (i.e., the correlated software information root hash value 314) of the software A, B and C respectively. Then, the tracing data creating module 3 uses the correlated software information root hash value 314 to create the hash tree tracing data (shown in FIG. 10) and uses the correlated software information root hash value 314 as a leaf node for effectively simplifying the data of software information.

The disclosure is described above in detail, albeit in the form of a preferred embodiment not restrictive of the implementation of the disclosure. All equivalent changes and modifications made to the disclosure according to the claims thereof must be deemed falling within the scope of the claims of the disclosure.

What is claimed is:

1. A method of attesting, examining and quickly tracing a software bill of materials, the method comprising the steps of:

registering with a coalition chain to gain right to access the coalition chain;

generating, by an e-wallet of a decentralized application module, at least one software coalition chain address;

changing, by the decentralized application module, at least one initial software bill of materials into an integration software bill of materials comprising a software artifact information, the software coalition chain address, at least one correlated software information and at least one correlated software coalition chain address;

using a tracing data creating module to treat a correlated coalition chain address as a leaf node and create a hash tree tracing data, the hash tree tracing data comprising at least the leaf node, at least one leaf node path data and a root hash value;

assigning, by the decentralized application module, the software coalition chain address to the integration software bill of materials and the hash tree tracing data to upload the integration software bill of materials and the hash tree tracing data to an InterPlanetary File System (IPFS), acquiring a software content identifier (CID) from the InterPlanetary File System; and assigning, by the decentralized application module, the software coalition chain address to the software content identifier to write the software coalition chain address and the software content identifier to the coalition chain to allow the coalition chain to attest the software content identifier and a corresponding software coalition chain address and store the integration software bill of materials, the hash tree tracing data, the software content identifier and the software coalition chain address in a matching database.

2. The method of claim 1, further comprising, after the coalition chain has attested the software content identifier and a corresponding software coalition chain address, the steps of: acquiring, by the decentralized application module, a software coalition chain address of a software artifact information to be examined; acquiring, by the decentralized application module, a software content identifier corresponding to the software coalition chain address in a coalition chain; acquiring, by the decentralized application module, an integration software bill of materials and a hash tree tracing data from the InterPlanetary File System according to the acquired software content identifier; examining, by the decentralized application module, a software artifact information in the acquired integration software bill of materials and the correlated software artifact information.

3. The method of claim 1, further comprising, after the coalition chain has attested the software content identifier and a corresponding software coalition chain address, the steps of: acquiring, by the decentralized application module, a software coalition chain address of a software artifact information to be traced and examined and a correlated software coalition chain address; acquiring, by the decentralized application module, the software content identifier corresponding to the software coalition chain address from the coalition chain; acquiring, by the decentralized application module, the integration software bill of materials and the hash tree tracing data from the InterPlanetary File System according to the acquired software content identifier; treating, by the decentralized application module through the tracing data creating module, at least one leaf node path data of the acquired hash tree tracing data and a correlated software component coalition chain address to be traced and examined as a leaf node and perform computation to generate a root hash value to be traced and examined; and comparing, by the decentralized application module, the root hash value of the acquired hash tree tracing data with the root hash value of the hash tree tracing data to be traced and examined.

4. The method of claim 3, wherein the leaf node creates the hash tree tracing data according to a sequence rule, the sequence rule requires searching the software coalition chain address and a correlated software coalition chain address and comparing the words of each address, from the starting word to the final word, from the least number to the greatest number, from a to z among lower case letters of the alphabet, and from A to Z among upper case letters of the alphabet, wherein, if the same alphanumeric appears at the same position, the next word will be compared to perform sorting, achieving a leaf node sequence, from left to right, in a hash tree for the software coalition chain address and the correlated software coalition chain address.

5. The method of claim 1, wherein one of a software supplier, a software integration administrator and a software security administrator registers with the coalition chain to gain right to access the coalition chain and become a coalition member of the coalition chain.

6. The method of claim 1, wherein the coalition chain has therein multiple trust channels for admitting the coalition member, sharing data, and isolating coalition members of different trust channels, and the software coalition chain address is assigned to the software content identifier, allowing the software content identifier to be written to an assigned trust channel in the coalition chain.

7. The method of claim 1, wherein the coalition chain uses a chain code to integrate correlated software coalition chain addresses and software content identifiers and generate a trustworthy set software coalition chain address.

8. The method of claim 2, wherein the correlated software information comprises at least one software component information and at least one preceding generation software information, and the correlated software coalition chain address comprises at least one software component coalition chain address and at least one preceding generation software information coalition chain address.

9. The method of claim 8, further comprising, after the coalition chain has attested the software content identifier and a corresponding software coalition chain address, the steps of: acquiring, by the decentralized application module, a software coalition chain address of a software artifact information to be traced and examined, and a software component coalition chain address or a preceding generation software information coalition chain address; acquiring, by the decentralized application module, the software content identifier corresponding to the software coalition chain address from the coalition chain; acquiring, by the decentralized application module, the integration software bill of materials and the hash tree tracing data from the InterPlanetary File System according to the acquired software content identifier; performing, by the decentralized application module, computation on at least one leaf node path data of the acquire hash tree tracing data, and the software component coalition chain address to be traced and examined or a preceding generation software information coalition chain address through the tracing data creating module to generate a root hash value; and comparing, by the decentralized application module, the root hash value of the acquired hash tree tracing data and the root hash value of the hash tree tracing data to be traced and examined.

10. A system of attesting, examining and quickly tracing a software bill of materials, the system comprising at least one electronic device, the coalition chain, the InterPlanetary File System and the matching database, wherein execution of the electronic device, the coalition chain, the InterPlanetary File System and the matching database causes the system to execute the method of claim 1.

11. The system of claim 10, wherein the electronic device is a coalition member node apparatus of the coalition chain, and the coalition member is one of a software supplier, a software integration administrator, and a software security administrator.

* * * * *